(12) United States Patent
Lu et al.

(10) Patent No.: US 7,083,536 B2
(45) Date of Patent: Aug. 1, 2006

(54) HYBRID SYSTEM WITH A CONTROLLABLE FUNCTION OF VARIABLE SPEED TRANSMISSION

(75) Inventors: Chun-Hsien Lu, Hsin Chu (TW); Ping-Huei Shu, Hsin Chu Hsien (TW); Chien-Tsung Wu, Hsin Chu Hsien (TW); Chi-Tang Hsu, Hsin Chu Hsien (TW); Huan-Lung Gu, Hua Lien (TW); Shian-Hsua Huang, Hsin Chu (TW); Tseng-Te Wei, Hsin Chu (TW); Ming Liang, Kaohsiung (TW)

(73) Assignee: Industrial Technology Research Institute, Chutung CHen (TW)

( * ) Notice: Subject to any disclaimer, the term of this patent is extended or adjusted under 35 U.S.C. 154(b) by 59 days.

(21) Appl. No.: 10/829,365

(22) Filed: Apr. 22, 2004

(65) Prior Publication Data

US 2005/0119083 A1 Jun. 2, 2005

(30) Foreign Application Priority Data

Nov. 28, 2003 (TW) .............................. 92133528 A (51) Int. Cl.
*F16H 3/72* (2006.01)
(52) U.S. Cl. ...................... 475/5; 477/3; 477/5; 477/37
(58) Field of Classification Search .................. 475/5; 477/3, 5, 37, 43; 123/179.28
See application file for complete search history.

(56) References Cited

U.S. PATENT DOCUMENTS

| | | | | |
|---|---|---|---|---|
| 6,009,365 A * | 12/1999 | Takahara et al. | ............... | 701/54 |
| 6,135,919 A * | 10/2000 | Shimakura | ................... | 477/157 |
| 6,524,217 B1 * | 2/2003 | Murakami et al. | ............. | 477/5 |
| 6,656,069 B1 * | 12/2003 | Sugano | ......................... | 474/28 |
| 2001/0024996 A1 * | 9/2001 | Sugano | .......................... | 477/2 |

* cited by examiner

*Primary Examiner*—Rodney H. Bonck
*Assistant Examiner*—David D. Le
(74) *Attorney, Agent, or Firm*—Alan D. Kamrath; Nikolai & Mersereau, P.A.

(57) ABSTRACT

The present invention generally relates to a hybrid system with a controllable function of variable speed transmission, especially to the reorganized hybrid system adopting a high efficiency and power saving transmission for vehicles traveling on different landforms and being convenient in maintenance, further that to avoid damaging components which being not in maintenance. Hence, the present invention adopts a plurality of power sources to cooperate each other for power transmission by way of a complex combination of the power sources and comprises: at least one first electric power driving device, at least one fuel driving device, at least one automatic clutching device, at least one continuously variable transmission device and at least one system-controlling device.

9 Claims, 8 Drawing Sheets

HYBRID SYSTEM WITH A CONTROLLABLE FUNCTION OF VARIABLE SPEED TRANSMISSION

BACKGROUND OF THE INVENTION

1. Field of the Invention

The present invention generally relates to a hybrid system with a controllable function of variable speed transmission, especially to the reorganized hybrid system adopting a high efficiency and power saving transmission for vehicles traveling on different landforms and being convenient in maintenance, further that to avoid damaging components which being not in maintenance.

2. Description of the Prior Art

For the past years, human being has being paid a large amount of values to develop a high technology environment, but the surviving rights of other creatures have being in a disaster instead. For instance, the disappearance of the ozone layer makes that a protection of ultraviolet rays should be maid; the existence of the ozone hole derives the temperature of the whole earth is rising continuously; further that, there are several regions snowing in June. Hence, any of creatures living in the planet may not avoid those strange phenomena and should accept the results made by human beings; particularly the above situations must be solved to not affect the next generations.

According to investigations, the traffic tools are one of the major reasons to cause the environmental pollutions. As it can be seen, the pollutions shall be appeared where the traffic tools being in, such as that airplanes injecting jet fuel in the air and the sea to make a 3-D pollution form and boats discharge fuel wastage into the sea to contaminate marine life. To eliminate the serious issue, a field for studying substituting energy or consuming the least present fuel to approach the best effect is on the road and worth to be developed completely. A consciousness of environmental protection has being built up gradually since twenty years ago. Scientists and biologists have being studied how to approach another highly developed life-style of human beings under the two conditions of not slowing down the speed for improving human being culture and considering the environmental protection. Therefore, for the aforesaid, some studied fields as electrical power automobile, solar system, anthracite and so on, the practical works for the whole environmental protection and the evolution have been started already and continuously.

In prior arts, only one single power resource is utilized obviously, such as diesel engine, solar system, electrical power driving system, etc. For those power systems talked above, some are with the advantages of high power efficiency and a long durability, but are with environmental problems, and vice versa. Originally to discard the traditional fuel engine is a new idea to apply on the electrical power automobile and the solar automobile, but the power efficiency is not as good as the ideal value so as to that to fully apply one single power source being impossible. Then a new concept with a new technology has come out to match not only the advantages of excellent power efficiency and long durability, but also the environmental concept.

Figure 1:
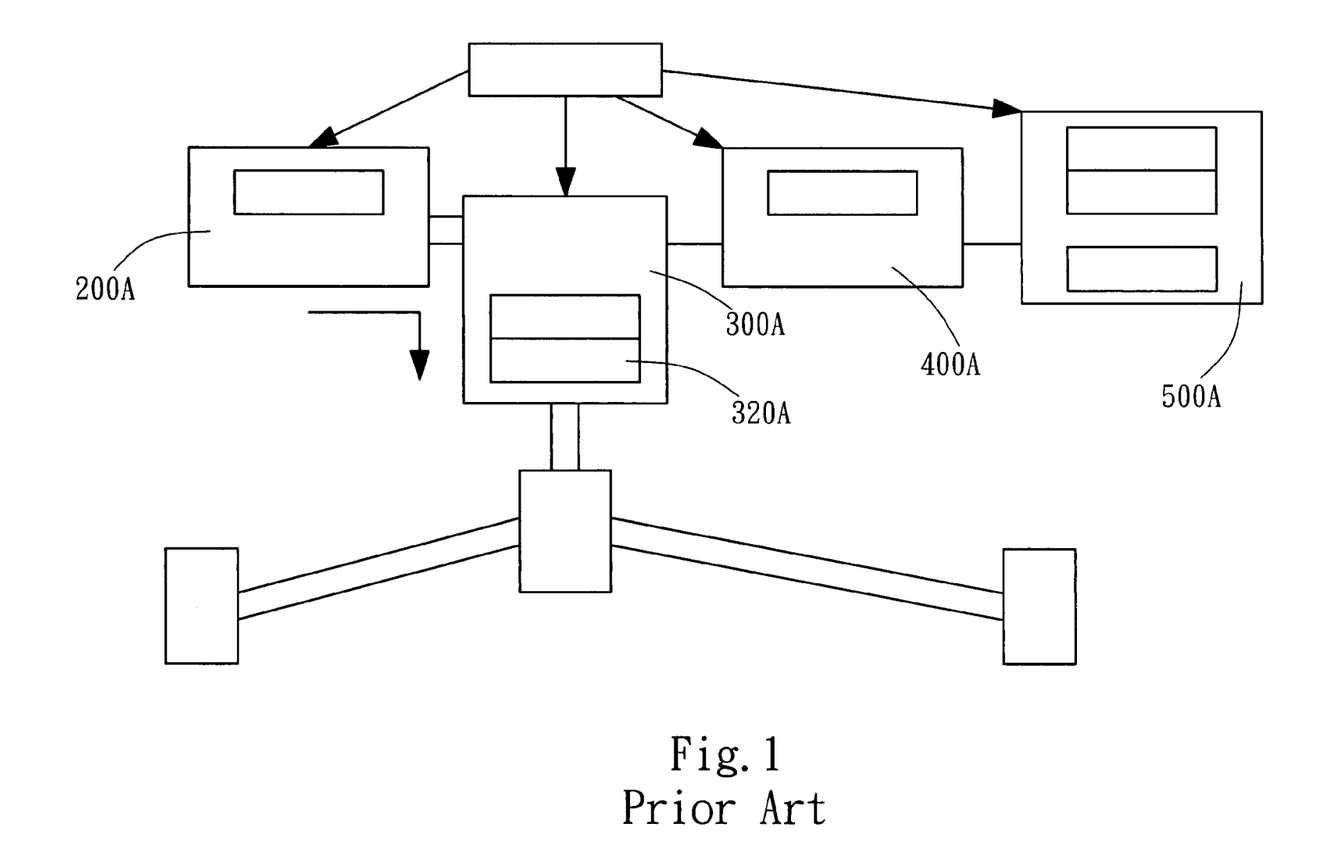
FIG. 1 is a sketch of a complex power driving device in prior arts.

Taiwan Patent Application Number 91111620 has disclosed the technical part as following: referring to FIG. 1, which is a sketch of a complex power driving device in prior arts. The power driving devices of the prior art are arranged as the following description. Generally, an electric power driving device 200A connects and electrically drives an automatic control device 300A as always. In case of more power output, a fuel driving device 400A is added to put more power onto the automatic control device 300A. Further that, an integrated power assistant device 500A can be a starter to ignite the fuel driving device 400A. The power arrangement still lacks of power driving, that is, the integrated power assistant device 500A can be another role as well, which is a power auxiliary while needing much more output. Such arrangement shall be inconvenient to main the driving device, especially to a continuously variable transmission device 320A in the automatic control device. As it can be seen, the electric power driving device 200A may be dismantled in advance. It is no doubt that the maintenance cost is raised; on the other hand, the power driving device may be damaged upon the electric power driving device 200A being dismantled time after time. Consequently, how to improve the power driving device is an issue discussed hereinafter.

SUMMARY OF THE INVENTION

The main objective of the present invention is to offer a hybrid system with a controllable function of variable speed transmission to adopt a continuously variable transmission device for promoting power efficiency. The continuously variable transmission device substitutes the intermittent transmission of the gear transmission device in prior arts and adopts continuous transmission to improve the transmission efficiency.

The second objective of the present invention is to offer a hybrid system with a controllable function of variable speed transmission to develop the design in prior arts for convenient maintenance. Due to that the continuously variable transmission device in prior arts being hidden in an automatic clutching device, an electrical power driving device and some components in the automatic clutching device shall be dismantled prior to maintenance, and the continuously variable transmission device just can be in services. Obviously, it cost a lot for the maintenance; and further, in case other devices and components are damaged, the lost cost is absolutely not worth and necessary. Therefore, the present invention proceeds a refinement for the location of the continuously variable transmission device for the convenience to maintenance and the least occurrence to damage other devices and components.

The third objective of the present invention is to offer a hybrid system with a controllable function of variable speed transmission to save power energy. The present invention adopts the cooperation of the traditional fuel engine and the electrical motor to save power. For instance, taking only one power driving source to fit a smooth landform is an option; otherwise, the fuel engine can be a power assistant while in a state of high efficiency or on a rough landform, hence, no more power shall be wasted while on a good condition.

The third objective of the present invention is to offer a hybrid system with a controllable function of variable speed transmission to approach environmental protection. To continue above instance, only the electrical power driving source or the fuel engine being applied may avoid a large amount of fuel wastage being discharged into the air to contaminate environment. So, in case of the most traffic tools accepting the present invention, the contaminating level in a year shall be lower down, and the total affection for the planet may then be sensed in a short time.

The present invention is a hybrid system with a controllable function of variable speed transmission adopting a plurality of power sources to cooperate each other for power transmission by way of a complex combination of the power sources, comprising: at least one first electric power driving device being a first power source of the system; at least one fuel driving device being a second power source of the system and started by regular fuel; at least one automatic clutching device controlling clutching actions of the fuel driving device and the first electric power driving device and located between the fuel driving device and the first electric power driving device; at least one continuously variable transmission device proceeding driving actions of continuously variable transmission; at least one integrated power assistant device, and the fuel driving device being between the automatic clutching device and the integrated power assistant for a series connection, the integrated power assistant device being capable of starting the fuel driving device rapidly and as a generator for modulating work loading after the fuel driving device working normally, on the other hand, the integrated power assistant device being another role of power assistant while needing more power output; at least one system-controlling device controlling actions among the first electric power driving device, the fuel driving device and the automatic clutching device. Thus the power coupling of the hybrid system functions to save power and protect environment, and the major advantages include: engine stopped in running of idle speed, to retrieve kinetic energy caused by stopping, to decrease the conditions of engine in transient condition and running in low speed and low loading, to combine different power sources to approach the maximum acceleration and one of the power sources being a power auxiliary. As a conclusion, the present invention uses two power sources, electric power and fuel, to save power energy and protect environment.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

Figure 2:
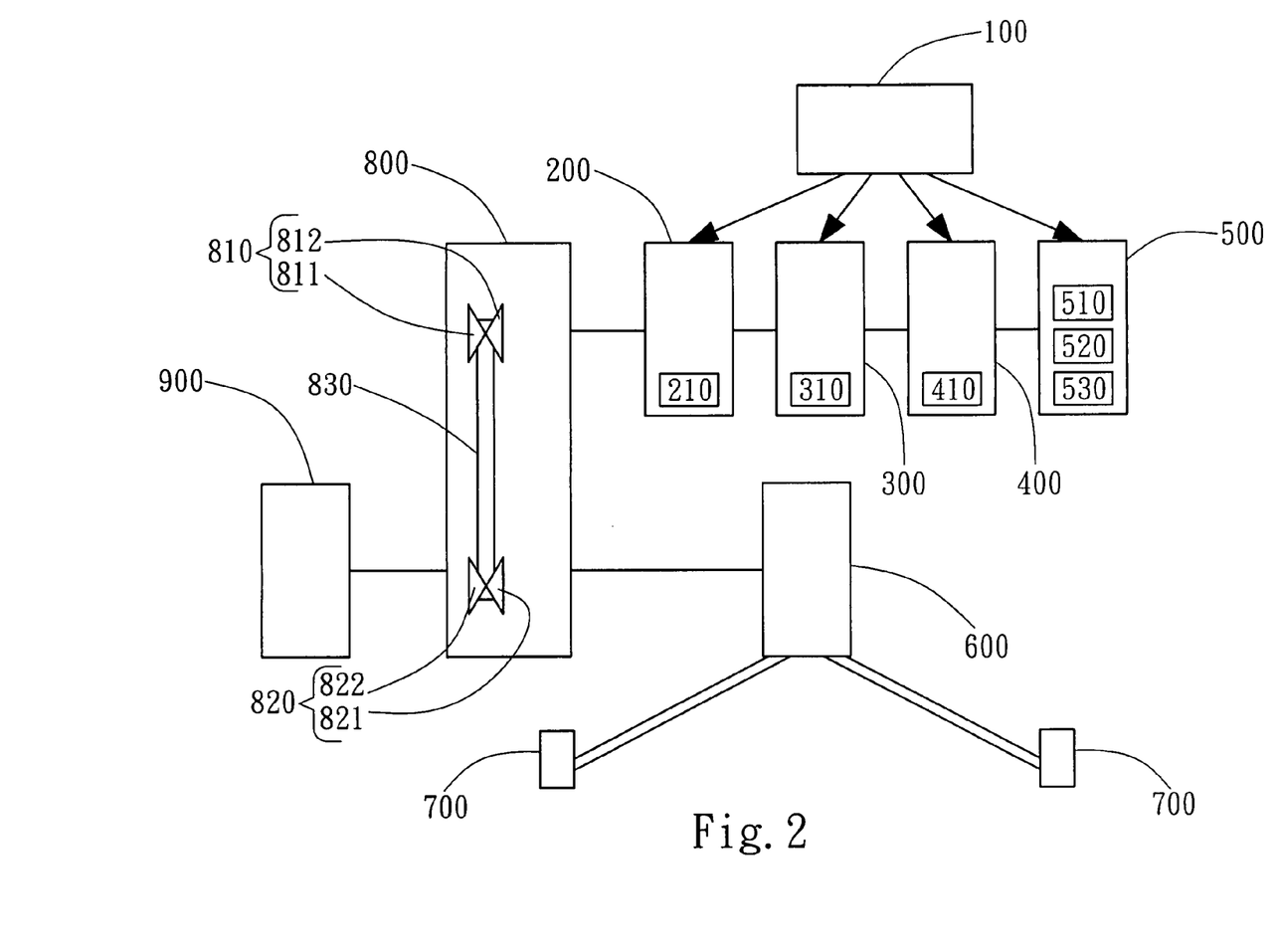
FIG. 2 is a sketch of a first preferred embodiment of the present invention.

Referring to FIG. 2, which is a sketch of a first preferred embodiment of the present invention. The present invention is a hybrid system with a controllable function of variable speed transmission adopting a plurality of power sources to cooperate each other for power transmission by way of a complex combination of the power sources, the power sources include electric power, fuel, solar power energy, etc., and the present invention produces an instance with the electric power and the fuel. The hybrid system comprises: at least one first electric power driving device 200, which is a first power source of the system and motivated by electric power source as a motor, and further comprises a motor control unit 210; at least one fuel driving device 400 which is a second power source of the system and started by an engine using regular fuel as gasoline, diesel and the like, and further comprises an engine control unit 410; at least one automatic clutching device 300, which controls clutching actions of the fuel driving device 400 and the first electric power driving device 200 and is located between the fuel driving device 400 and the first electric power driving device 200, and further comprises an auto-control clutch 310 to assemble the fuel driving device 400 and the first electric power driving device 200 in serial connection for power driving but with a function of a parallel connection, that is, firstly the automatic clutching device 300 is separated while the fuel driving device 400 is not working, and the first electric power driving device 200 outputs power by means of a continuously variable transmission device 800, secondly, the first electric power driving device 200 is only the role of a flywheel while not running, and the automatic clutching device 300 connects to the first electric power driving device 200 so as to that the fuel driving device 400 outputs power energy to the continuously variable transmission device 800 via the first electric power driving device 200 and the automatic clutching device 300, thirdly, while both the fuel driving device 400 and the first electric power driving device 200 are in running and simultaneous and connect to the automatic clutching device 300 for power energy coupling, then the power energy is transferred to the continuously variable transmission device 800 as well, fourthly, while the first electric power driving device 200 switching to a role of a generator and connecting to the automatic clutching device 300, the fuel driving device 400 drives the automatic clutching device 300 to start the first electric power driving device 200, and the first electric power driving device 200 therefore recharges itself while running; the continuously variable transmission device 800, which proceeds driving actions of continuously variable transmission by means of the first electric power driving device 200 and has a front pulley 810 and a rear pulley 820, each pulley further includes a sliding pulley and a fixing pulley, which means a front sliding pulley 812 and a front fixing pulley 811 for the front pulley 810 and a rear sliding pulley 822 and a rear fixing pulley 821 for the rear pulley 820, the front sliding pulley 812 is symmetrical and reverse to the rear sliding pulley 822, and same as the arrangement of the front fixing pulley 811 and the rear fixing pulley 821, a V belt 830 connects both pulleys 810 and 820; at least one integrated power assistant device 500, and the fuel driving device 400 is between the automatic clutching device 300 and the integrated power assistant device 500 for a series connection, the integrated power assistant device 500 further comprises a starting generator 510, a multi-stage power switch unit 520 and a battery control unit 530, the integrated power assistant device 500 is then capable of starting the fuel driving device 400 rapidly and as a generator for modulating work loading after the fuel driving device 400 working normally as well, on the other hand, the integrated power assistant device functions another role of power assistant while needing more power output; at least one system-controlling device 100, which controls actions among the first electric power driving device 200, the fuel driving device 400, the integrated power assistant device 500 and the automatic clutching device 300. As it can be seen, the parallel connection of the first electric power driving device 200 and other devices and the series connection of the first electric power driving device 200 and the continuously variable transmission device 800 are to drive a differential mechanism 600, a plurality of wheels 700 for a vehicle running on different landforms.

According to the present invention, the continuously variable transmission device 800 connects to the first electric power driving device 200 as always; the fuel driving device 400 are off to the auto-control clutch 310 of the automatic clutching device 300 normally and driven by the automatic clutching device 300. That is, the automatic clutching device 300 connects to the fuel driving device 400 in parallel immediately while the whole system needing more power output. Further, in case of a vehicle needing more power for a rough landform and the fuel driving device 400 providing additional power, the integrated power assistant device 500 may ignite the fuel driving device 400 rapidly via the starting generator 510; after the fuel driving device 400 working in a normal condition, the integrated power assistant device 500 transfers its role to a generator by means of the multi-stage power switch unit 520 for modulating the loading of the fuel driving device 400, and vice versa; in addition, the integrated power assistant device 500 provides electrical energy to start the fuel driving device 400 through the battery control unit 530, and furthermore, the device 500 cooperates with the multi-stage power switch unit 520 to charge redundant electrical energy back to the battery after the fuel driving device 400 running properly.

Another preferred embodiment of the present invention is the disregard of the integrated power assistant device 500. Actually, the fuel driving device 400 can be installed a starting system therein; on the other hand, the continuously variable transmission device 800 is able to be ignited by a hydraulic power driving device or a second electric power driving device thereof to proceed the movements of the two sliding pulleys.

Following will discuss the continuously variable transmission device 800 in detail. Since a first power system being appeared, the way of a gear transmission mechanism of a gear ratio with a fixed value being temporary was understood. Therefore, the way adopting continuously variable transmission was disclosed from the beginning of the twentieth century for adequate and continuous power output. The studied fields at that moment were roughly mechanical type, hydraulic type or fluid type and electrical type, and as a matter of fact, the present primary concept for traditional transmission was built up since then. The traditional positive infinitely variable system (PIV System) has three problems as durability, performance and system control inevitably for hardly approaching practicality. Further, the gear transmission system has become a primary technology gradually according to the features as improvement, simplicity, cost-saving. Another important factor is that more serial legislation for contamination was generated to cause that engine efficiency being focused again, and the key cooperation of the traditional transmission system and the engine performance has been found, the positive infinitely variable system with more drive ratio and continuously variable transmission was discussed again. Today, material, producing and microcomputer have made the continuously variable transmission for vehicle to step into an advance stage.

Figure 3:
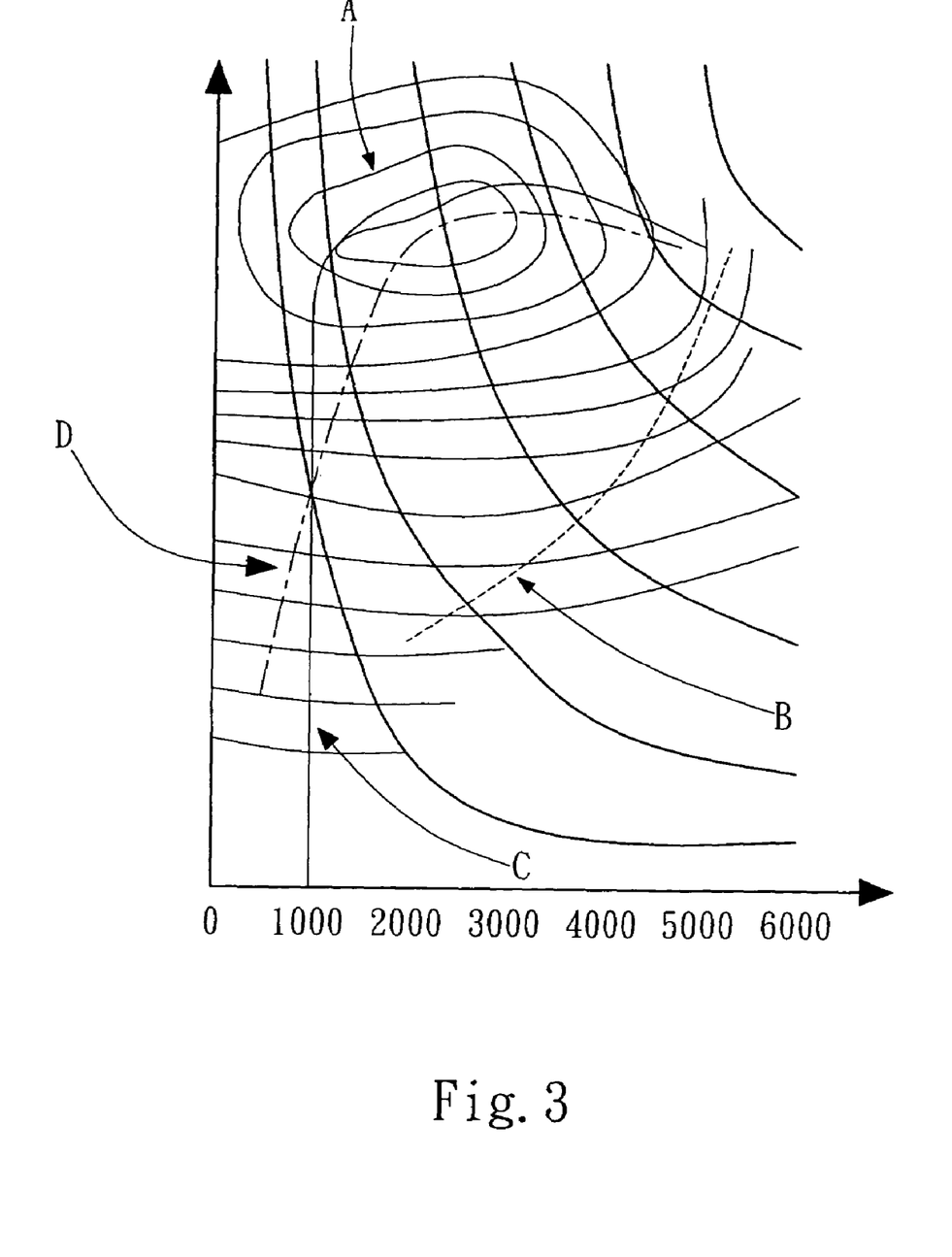
FIG. 3, which is a statistical chart of constant fuel-consumption lines of a typical vehicle in the present invention.

Referring to FIG. 3, which is a statistical chart of constant fuel-consumption lines of a typical vehicle in the present invention. Following terminologies shall be defined as: retardation ratio (R), which is a ratio of an input axis and an output axis and defined as an output of a fixed retardation ratio; maximum retardation ratio (Rmax), which is a maximum value of the retardation radio offered by a transmission system; minimum retardation ratio (Rmin), which is a minimum value of the retardation radio offered by the transmission system; transmission ratio (Rmax/Rmin), which is defined as the Rmax over the Rmin and a range for the retardation ratio offered by the transmission system. For instance, a gear transmission system with 4 shifts includes an output for the maximum retardation ratio, a first shift, and another output for the minimum retardation ratio, a fourth shift. It is obvious that there are only four retardation ratios being used. The continuously variable transmission has only two restrictions, the maximum retardation ratio and the minimum retardation ratio, and therefore any retardation ratio may be reached within the maximum retardation ratio and the minimum retardation ratio. More, a value of the retardation ratio for the continuously variable transmission is 6, greater than the gear transmission system. So, it is confirmative that the range of the continuously variable transmission is wider. A horizontal axis in FIG. 3 is defined as engine speed and a vertical axis is defined as engine torque, therefore, a closed curve line A, an equal fuel-consumption line, on an upper part of FIG. 3 represents a lowest fuel-consumption point in physical phenomena, that is, the closed area means the best efficiency for running engine. Generally an engine running along a best fuel-consumption line is capable of approaching a best performance of anti-contamination, and the gear transmission system in prior arts hardly reach this. For example, a 4-shift operating line B on a lower part of FIG. 3 is far away from a best fuel-consumption area and the best fuel-consumption line C, and line B is also restricted by the fixed retardation ratio and a transmission ratio so as to that an operation of an engine reaching the best fuel-consumption line C being an ideal condition merely. On the contrary, an operation of the continuously variable transmission system may be along a curved line D, close to the best fuel-consumption C, according to the features of a greater transmission ratio and the continuously variable speeds; continuously variable speeds; further, a continuous power output provided by the continuously variable transmission system grants a function of excellent driving to make itself be popular.

Figure 4:
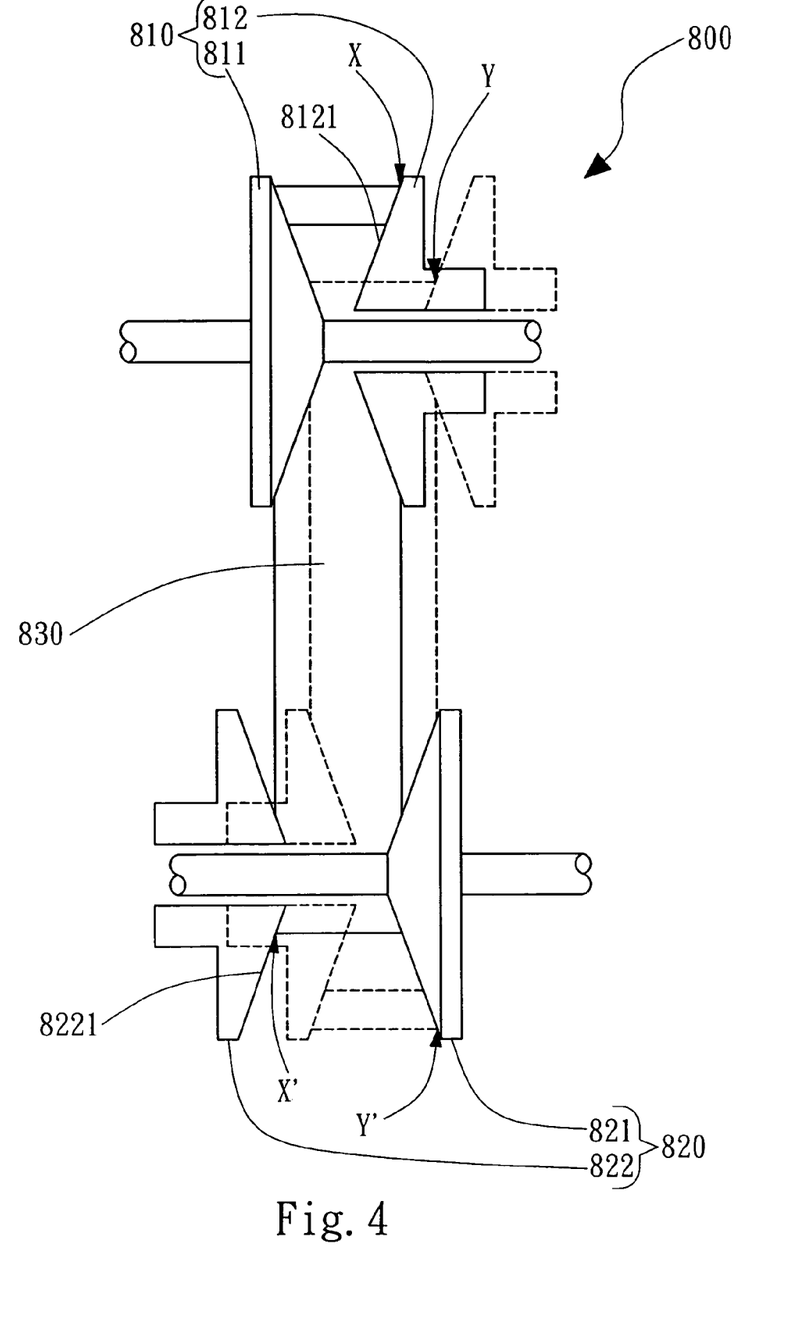
FIG. 4 is a sketch of a continuously variable transmission system of the present invention.

Referring to FIG. 4, which is a sketch of a continuously variable transmission system of the present invention. The continuously variable transmission device 800 comprises a front pulley 810, a rear pulley 820 and a V belt 830. The front pulley 810 further has a front sliding pulley 812 and a front fixing pulley 811, the sliding pulley 812 includes a front sliding pulley surface 8121 and the rear pulley 820 further has the rear fixing pulley 821 and the rear sliding pulley 822, the rear sliding pulley 822 includes a rear sliding pulley surface 8221. The V belt 830 surrounds the front pulley 810 and the rear pulley 820 for transmission. Assuming the front pulley 810 driving the rear pulley 820, V belt 830 touches onto both a first front position X of the front sliding pulley surface 8121 of the front sliding pulley 812 of the front pulley 810 and a first rear position X' of the rear sliding pulley surface 8221 of the rear sliding pulley 822 of the rear pulley 820. Above description is to introduce the relative relationships for those members in FIG. 4 before working. While starting working, front sliding pulley 812 and rear sliding pulley 822 move back and forth along their own shafts to change the positions for V belt 830 on front sliding pulley surface 8121 and rear sliding pulley surface 8221. Due to the position change as aforesaid and the application of the inclined front sliding pulley surface 8121 and the inclined rear sliding pulley surface 8221, the continuously variable transmission is then produced successfully. It is understood that the frictions between a set of V belt 830 and front sliding pulley surface 8121 and another set of V belt 830 and rear sliding pulley surface 8221 are the main forces for transmission. While V belt 830 shifting to a second front position Y on front sliding pulley surface 8121 and a second rear position Y' on rear sliding pulley surface 8221, the maximum retardation ratio is then generated. (front sliding pulley 812 and rear sliding pulley 822 appeared as dot lines in FIG. 4)

Figure 5:
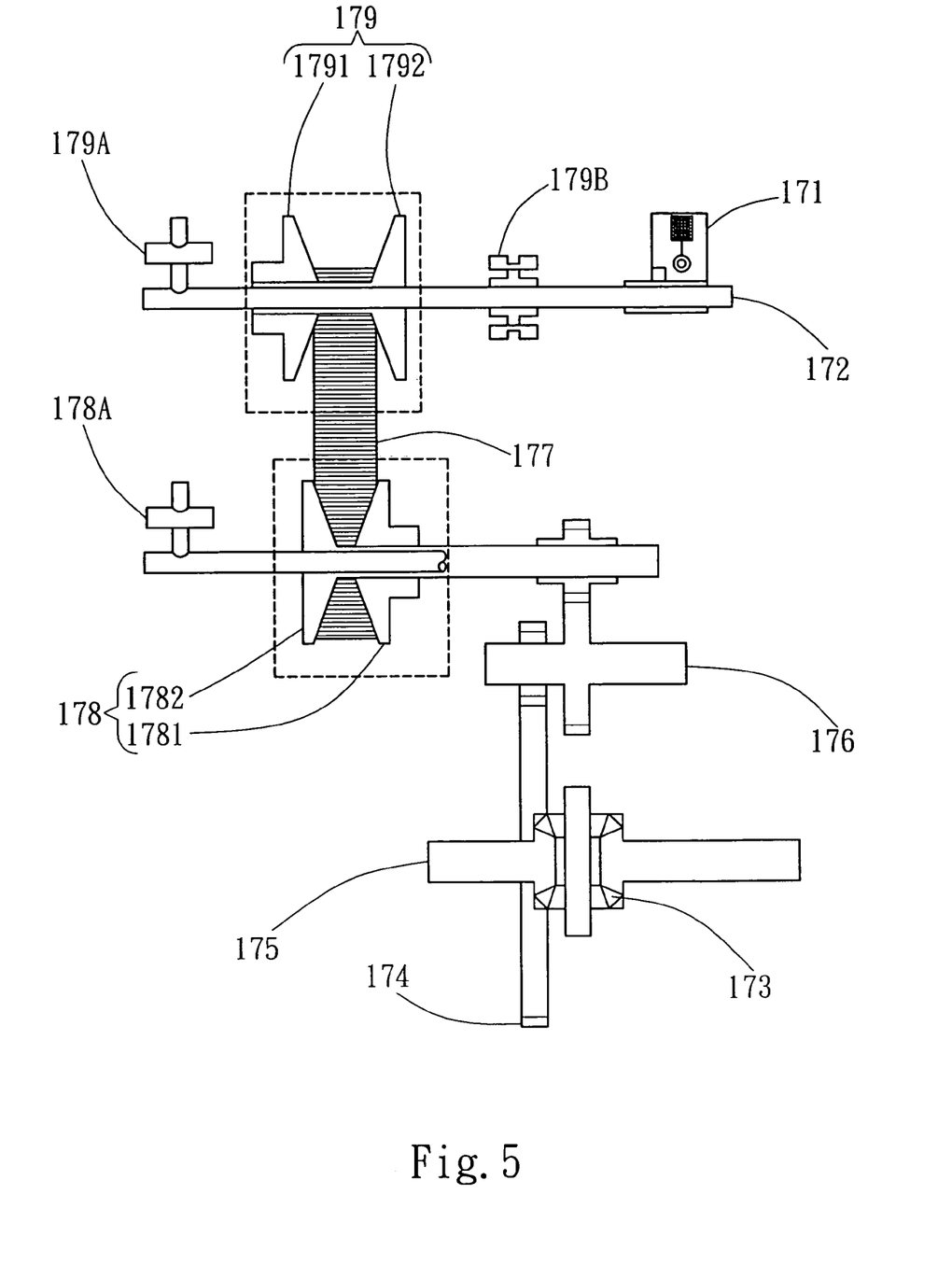
FIG. 5 is a structural sketch of an electromagnetic continuously variable transmission system (ECVT) of the present invention.

Referring to FIG. 2 again, electric power driving device 200 drives that front sliding pulley 812 and rear sliding pulley 822 moving back and forth along their own axes, therefore how device 200 working with continuously variable transmission device 800 may be discussed as following. Referring to FIG. 5, which is a structural sketch of an electromagnetic continuously variable transmission system (ECVT) of the present invention. The ECVT system comprises an electromagnetic clutch 171, a driving shaft 172, a differential mechanism 173, a last retardation gear 174, a wheel axle 175, a middle retardation shaft 176, a steel belt 177, a driven pulley 178, an oil pump 178A, a driving pulley 179, an oil pump 179A and a position-shift mechanism 179B, wherein the driven pulley 178 includes a rear sliding pulley 1781 and a rear fixing pulley 1782, the driving pulley 179 includes a front sliding pulley 1791 and a front fixing pulley 1792. The electromagnetic clutch 171 with smaller volume and lighter weight provides better efficient and control and adopts a simultaneous occlusion gear mechanism instead of epicyclic gear set, especially the weight of electromagnetic clutch 171 is 70% of traditional clutch. The oil pump 178A fills with oil for hydraulic power moving the rear sliding pulley 1781 back and forth, similarly the oil pump 179A is another hydraulic power source moving the front sliding pulley 1791 back and forth. The whole system is controlled by a micro computer and a light system with the weight of 45.4 kg, 2.503 of the maximum retardation ratio and 0.497 of the minimum retardation ratio.

Figure 6:
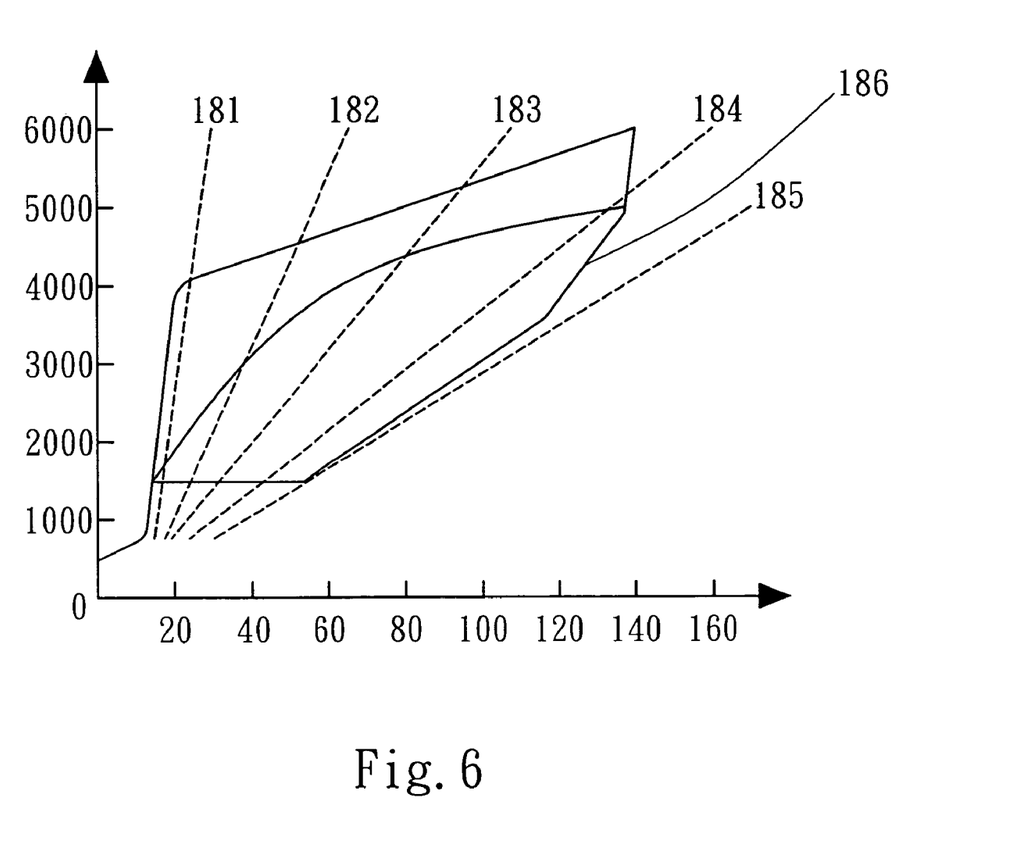
FIG. 6, which is a statistical chart of comparing an ECVT system (Electromagnetic Continuously Variable Transmission of SUBARU in Japan) and a CTX system (Continuously Variable Trans.-Axle of Ford in States)

Referring to FIG. 6, which is a statistical chart of comparing an ECVT system (Electromagnetic Continuously Variable Transmission of SUBARU in Japan) and a CTX system (Continuously Variable Trans.-Axle of Ford in States). The horizontal axis is defined as vehicle speed, and the vertical axis represents rotational speed. Dot lines 181, 182, 183, 184 and 185 are defined as the retardation ratios of the first shift, the second shift, the third shift, the fourth shift and the fifth shift respectively. A line 186 is a retardation ratio line of the electromagnetic continuously variable transmission system, wherein a portion of the line 186 near the horizontal axis elongating from lower left up to upper right represents the minimum retardation ratio; a top portion of the line 186 extending toward upper right shows the maximum retardation ratio. As showing in FIG. 6, the control strategies of the two systems are different. Both retardation ratios of two systems are varied between the minimum retardation ratio and the maximum retardation ratio while in normal state; engine speed over 3000 rpm may change retardation ratio while ECVT system choosing Ds, and it is to suit a landform of ramp.

Figure 7:
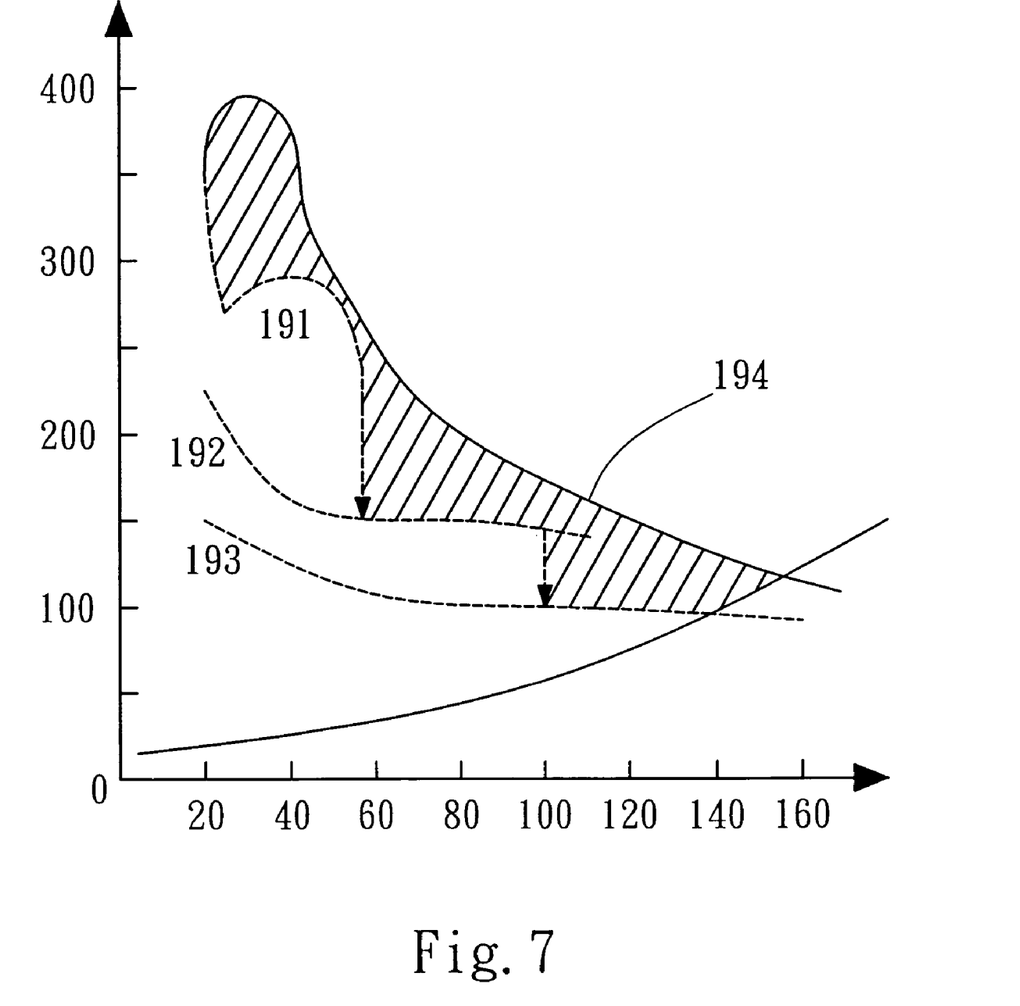
FIG. 7 is a statistical chart of comparing ECVT system and a three-stage automatic variable transmission system.

Referring to FIG. 7, which is a statistical chart of comparing ECVT system and a three-stage automatic variable transmission system. The horizontal axis is defined as vehicle speed, and the vertical axis represents driving force. Dot lines 191, 192 and 193 are defined as the driving forces of the first shift, the second shift and the third shift respectively. A line 194 elongated from upper left down to lower right represents the driving forces of ECVT system. FIG. 7 teaches that both system have the same operation ability, but ECVT system functions better driving ability and fuel-consumption. Besides, due to the continuous power output, ECVT system is with excellent acceleration and the table for listing two acceleration values of two systems is as following:

| Acceleration | 0~400 m | 50~80 km/h |
|---|---|---|
| ECVT system | 20.5 sec | 5.7 sec |
| Three-stage automatic variable transmission system | 22.2 sec | 7.6 sec |

Figure 8:
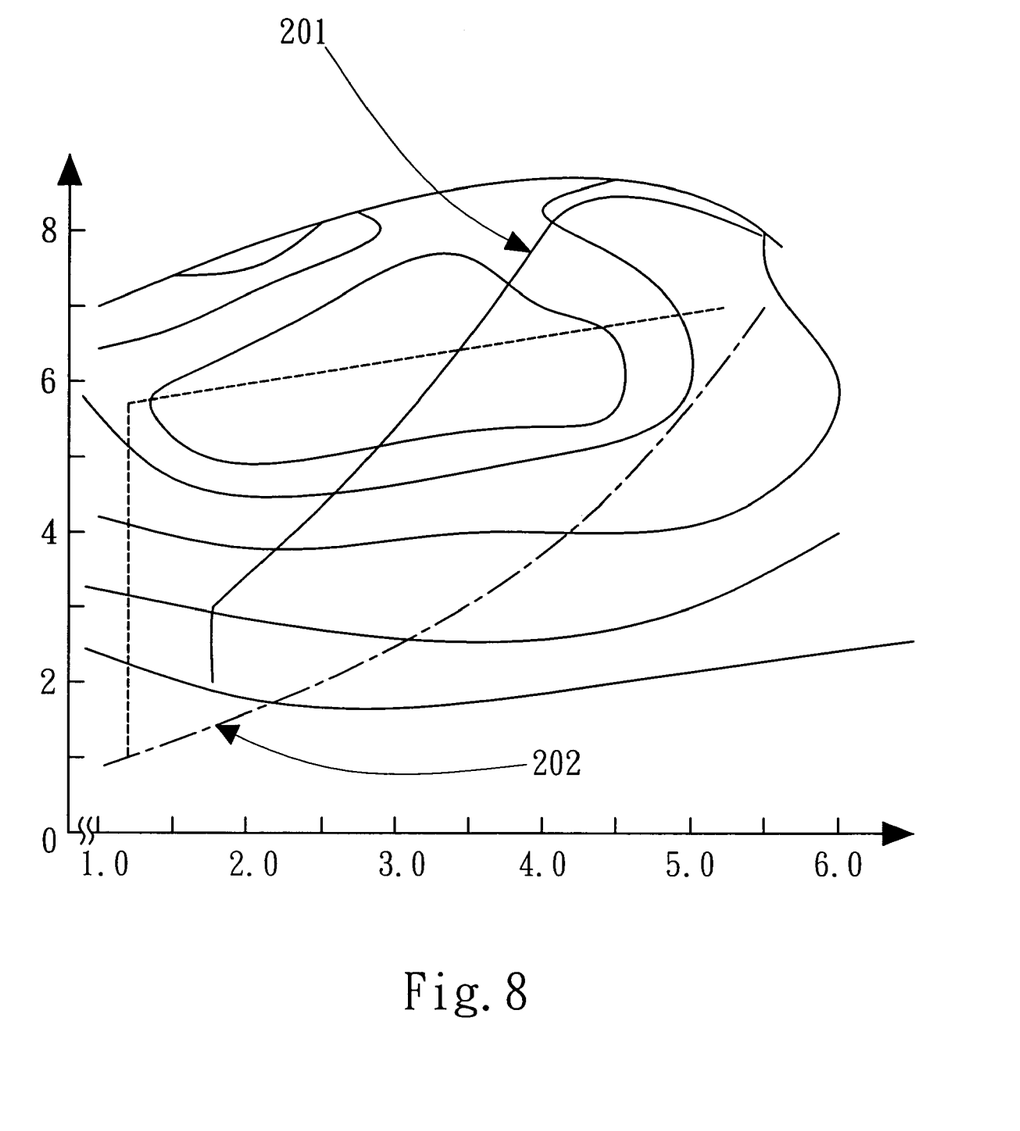
FIG. 8 is a statistical chart in a constant speed of comparing ECVT system and the three-stage automatic variable transmission system.

Referring to FIG. 8, which is a statistical chart in a constant speed of comparing ECVT system and the three-stage automatic variable transmission system. The horizontal axis is defined as engine speed (rpm), and the vertical axis represents torque (kgf-m). A line 201 elongating from lower left up to upper right and near the vertical axis is a fuel-consumption line in a constant speed of ECVT system; a line 202 elongating also from lower left up to upper right and near the horizontal axis is a fuel-consumption line in a constant speed of the three-stage automatic variable transmission system. It is understood that running of an engine of ECVT system is distributed around an economic area. That is, 3000 rpm of a value of engine speed for both the three-stage automatic variable transmission system and ECVT system may derive 2.6 kgf-m and 5.7 kgf-m of two torques for both systems respectively. As it can be seen, the engine for ECVT system may be more efficient.

The arrangement of the devices of the present invention is much more close to human nature and convenient to maintenance, especially to feature that the portion not dismantled for maintenance may be kept for avoiding damaging while in service so as to that components being longer life and services being more efficient. Therefore, the present invention is full of utility. On the other hand, ECVT system is adopted by the present invention and a fuel-saving and high efficient device; additionally, a programmable motor installed on ECVT system is capable of setting different parameters according to landforms, operating custom and other conditions. It develops that the acceleration is increased due to longer time to set retardation ratio. The ECVT system of the present invention has a function of two-way driving, which means that an electrical power driving device or a hydraulic power driving device equipped to ECVT system drives the front sliding pulley and the rear sliding pulley simultaneously so as to make any action response rapidly. As a conclusion, the present invention is able to suit any landform and completely full of novelty.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A hybrid system with a controllable function of variable speed transmission adopting a plurality of power sources for power transmission by way of a complex combination of the power sources, comprising:

at least one first electric power driving device being a primary power source of the system;

at least one fuel driving device being a secondary power source of the system and started by combustible fuel;

an integrated power assistant device coupled to the fuel driving device selectively operable to start and restart the fuel driving device as needed while the first electric power driving device is providing primary driving power, to generate power responsive to the fuel driving device working, and to assistively and directly augment the driving power of the fuel driving device with additional driving power;

at least one automatic clutching device controlling clutching actions of the fuel driving device and the first electric power driving device and located between the fuel driving device and the first electric power driving device;

at least one continuously variable transmission device for generating driving actions, the continuously variable transmission further having another power source for actuation thereof, the continuously variable transmission device including a reconfigurable pulley assembly operable responsive to an electromagnetic clutch unit coupled thereto;

at least one system-controlling device controlling actions among the first electric power driving device, the fuel driving device, the integrated power assistant device, and the automatic clutching device; and wherein the fuel driving device is disposed between the automatic clutching device and the integrated power assistant device for series connection directly therewith; and, the first electric power driving device is connected to the fuel driving device, the automatic clutching device, and the continuously variable transmission device in series.

2. The hybrid system with a controllable function of variable speed transmission as recited in claim 1, wherein the integrated power assistant device further comprises a starting generator, a multi-stage power switch unit, and a battery control unit.

3. The hybrid system with a controllable function of variable speed transmission as recited in claim 1, wherein the continuously variable transmission device further comprises:

a front pulley assembly and a rear pulley assembly, and each of the front and rear pulley assemblies including opposed movable and fixed pulleys, the movable pulleys of the front and rear pulley assemblies being reversed in orientation one relative to the other, the front and rear pulley assemblies being connected by a V-belt, each of the movable pulleys being selectively driven to move relative to the fixed pulley corresponding thereto; and, a middle retardation shaft driven responsive to the rear pulley.

4. The hybrid system with a controllable function of variable speed transmission as recited in claim 1, wherein the plurality of power sources comprises at least one of the following: electric power, fuel, and solar power energy.

5. The hybrid system with a controllable function of variable speed transmission as recited in claim 1, wherein the first electric power driving device is a motor and further comprises a motor control unit.

6. The hybrid system with a controllable function of variable speed transmission as recited in claim 1, wherein the fuel driving device and the automatic clutching device are selectively engaged for power driving by means of the automatic clutching device.

7. The hybrid system with a controllable function of variable speed transmission as recited in claim 1, wherein the fuel driving device is an engine and further comprises an engine control unit.

8. The hybrid system with a controllable function of variable speed transmission as recited in claim 1, wherein the combustible fuel is one of the following: gasoline and diesel.

9. The hybrid system with a controllable function of variable speed transmission as recited in claim 1, wherein the automatic clutching device further comprises an auto-control clutch to assemble the fuel driving device and the first electric power driving device in series connection for power driving but with a function of a parallel connection.

* * * * *

UNITED STATES PATENT AND TRADEMARK OFFICE
CERTIFICATE OF CORRECTION

| | |
|---|---|
| PATENT NO. | : 7,083,536 B2 |
| APPLICATION NO. | : 10/829365 |
| DATED | : August 1, 2006 |
| INVENTOR(S) | : Chun-Hsien Lu et al. |

Page 1 of 1

It is certified that error appears in the above-identified patent and that said Letters Patent is hereby corrected as shown below:

Tiyle Page, (75) Inventors:, cancel "Ming Liang" and substitute therefore --Chih-Ming Liang--.

Signed and Sealed this

Twenty-third Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,083,536 B2  Page 1 of 1
APPLICATION NO. : 10/829365
DATED : August 1, 2006
INVENTOR(S) : Chun-Hsien Lu et al.

It is certified that error appears in the above-identified patent and that said Letters Patent is hereby corrected as shown below:

Title Page, (75) Inventors:, cancel "Ming Liang" and substitute therefore --Chih-Ming Liang--.

This certificate supersedes Certificate of Correction issued January 23, 2007.

Signed and Sealed this

Fourth Day of December, 2007

JON W. DUDAS
*Director of the United States Patent and Trademark Office*